July 31, 1934.   B. H. WAGNER   1,968,431
VENTILATOR
Filed April 27, 1932
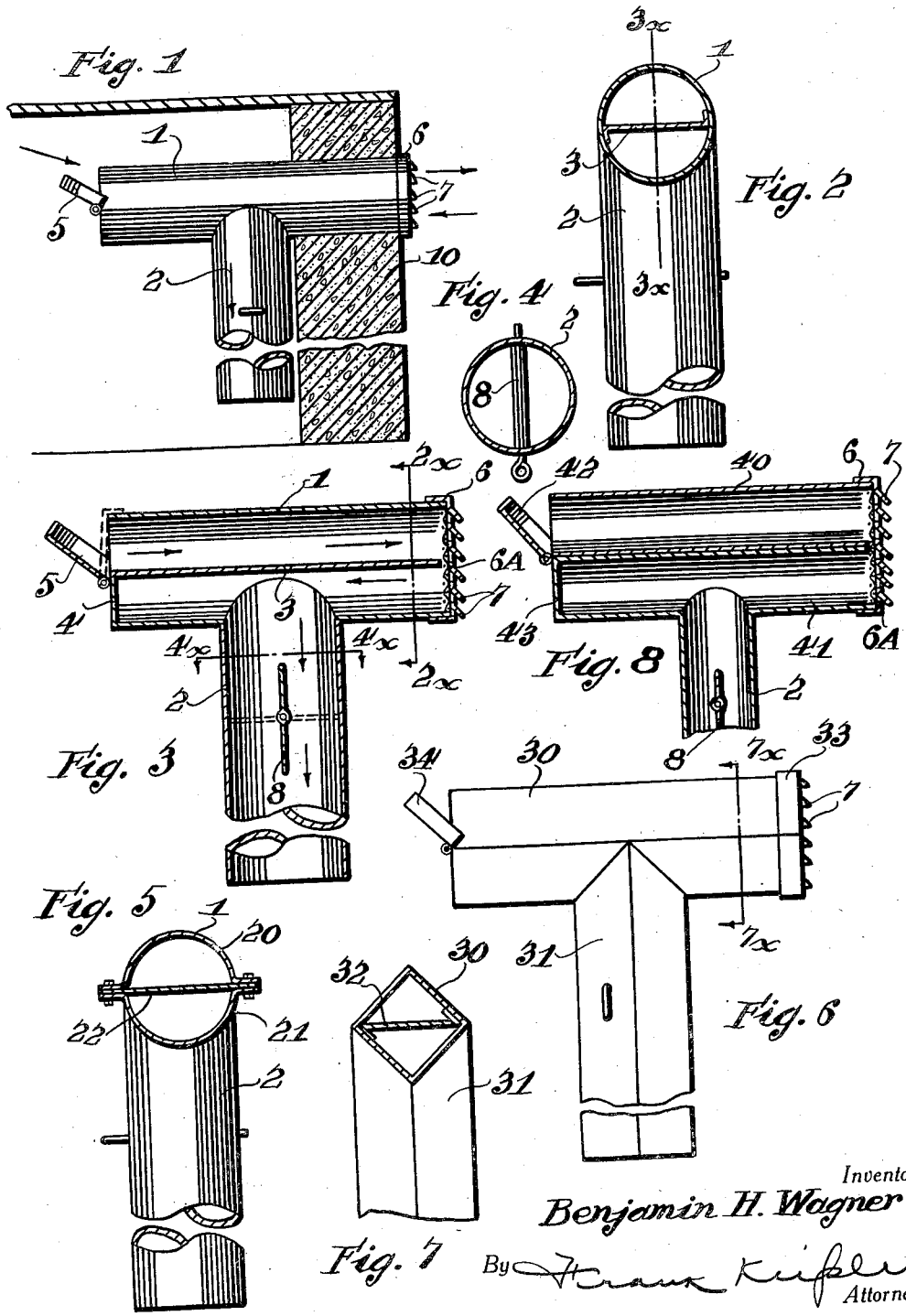
Inventor
Benjamin H. Wagner
By Frank Kiefer
Attorney Patented July 31, 1934

1,968,431

UNITED STATES PATENT OFFICE 1,968,431

VENTILATOR

Benjamin H. Wagner, Henrietta, N. Y.

Application April 27, 1932, Serial No. 607,803

3 Claims. (Cl. 98—32)

The object of this invention is to provide a new and improved ventilator for houses, to be used more especially in the cellar for ventilation of the cellar, although it can be built into partitions and used on the first and second floors of houses.

Another object of the invention is to build the ventilator so that it is compact and is easily installed.

These and other objects of the invention will be illustrated in the drawing, described in the specification and pointed out in the claims at the end thereof.

In the drawing:

Figure 1 is a side elevation of the apparatus installed in the cellar wall of the house.

Figure 2 is a transverse sectional elevation, the section being taken on the line 2x 2x of Figure 3.

Figure 3 is a longitudinal sectional elevation of the device, the section being taken on the line 3x 3x of Figure 2.

Figure 4 is a horizontal section taken on the line 4x 4x of Figure 3.

Figure 5 is a sectional elevation of the device, showing a modified form thereof.

Figure 6 is a side elevation of the device, showing a modified form thereof.

Figure 7 is a sectional elevation of the device shown in Figure 6, the section being taken on the line 7x 7x of Figure 6.

Figure 8 is a longitudinal section of another modified form of the ventilating device.

In the drawing like reference numerals indicate like parts.

In the drawing reference numeral 1 indicates a pipe that constitutes the horizontal duct, and reference numeral 2 indicates a pipe that constitutes the vertical duct. In the pipe 1 is placed a partition 3 that runs through the whole length thereof and divides it into two separate air passages.

The pipe 2 is joined to the under side of the pipe 1 so that air can pass freely from the lower half of the pipe 1 into the pipe 2, or so that air can pass in the reverse direction.

As shown in Figure 3, the lower half of the pipe 1 is closed with a stationary wall or plate 4, and the upper half is closed with a swinging plate or damper 5 that can be opened or closed at will. The hinge for the damper is made tight so that the damper will remain in any position desired.

The right hand end of the pipe 1 is covered with the cap 6, which is perforated with louvers. Inside of this cap is placed a screen 6A, which keeps out flies and insects. The upright pipe 2 has a damper 8 therein, by which the pipe may be closed or opened to the circulation of air.

This device is set into the foundation wall 10 of a house near the top thereof, or as high up in the cellar as is practical, as is shown in Figure 1. The cap 6 is located on the outside of the wall, and is so arranged that with the damper 8 open, air can pass through the lower half of the pipe from the outside and down through the pipe 2 into the cellar. In this way the cellar would be kept cool. Any warm air in the cellar would pass out through the upper half of the pipe 1, as long as the damper 5 were open. If the damper 5 were closed, the circulation of air would be cut off from this part of the device.

In Figure 5 I have shown a modification of this device, in which the upper pipe 1 is made in two sections 20 and 21, each of which is provided with flanges which are brought together to form a complete pipe. Between the flanges is clamped the division plate 22, which in all other respects is substantially like the plate 3. The upright pipe 2 connects with the lower half 21 of the horizontal pipe, and the device functions in the same way as does the device shown in Figures 1, 2, 3 and 4 above described.

As shown in Figures 6 and 7, the pipes 30 and 31 may be made square in cross section, and the pipe 30 will have the horizontal division plate 32 therein, which is similar to the plate 3 shown in Figures 2 and 3. The outside end will be covered with a cap 33, similar to the cap 6, and a damper 34 will be provided, similar to the damper 5.

In Figure 8 I have shown another modification of my ventilating device, in which two separate pipes are used 40 and 41, the upper pipe 40 having a damper 42 thereon, and the pipe 41 being closed at the left hand end, as indicated at 43. The device in this figure functions in the same way as the other devices above described.

I claim:

1. In a ventilator the combination of a horizontal tube and a vertical tube connected therewith, a partition in said horizontal tube dividing it into two parallel passageways, the vertical tube connecting with the lower one of said passageways at the middle of the horizontal tube, said lower passageway being sealed at one end and open at the other end, the other horizontal passageway being open at both ends.

2. In a ventilator the combination of a horizontal tube and a vertical tube connected therewith forming a T, a partition in said horizontal tube dividing it into two parallel passageways, the vertical tube connecting with the lower one of said passageways in the horizontal tube at the middle thereof, said vertical tube being located on the inside of a room and adapted to discharge cool air into said room near the floor, said lower horizontal passageway being completely sealed at one end and open at the other end, the other horizontal passageway being open at both ends.

3. In a ventilator, the combination of a horizontal tube and a vertical tube connected therewith, a partition in said horizontal tube dividing it into two parallel horizontal passageways, a vertical tube connecting with the lower one of said passageways at the middle of the horizontal tube, said lower passageway being sealed at one end and being open at the other end, the upper horizontal passageway being open at both ends, a cap mounted to swing on one end of the upper passageway to regulate the flow of air therethrough.

BENJAMIN H. WAGNER.